United States Patent [19]

Sallavanti et al.

[11] Patent Number: 4,800,122
[45] Date of Patent: Jan. 24, 1989

[54] SILOXANE-BASED TINTABLE COATING

[75] Inventors: Robert A. Sallavanti, Dalton, Pa.; Jeffrey L. Dalton, Dudley, Mass.; Sharon M. Olsen, Thompson, Conn.

[73] Assignee: Gentex Corporation, Carbondale, Pa.

[21] Appl. No.: 99,390

[22] Filed: Sep. 22, 1987

[51] Int. Cl.$^4$ ............................................. B32B 27/36
[52] U.S. Cl. ...................... 428/412; 427/386; 427/387; 428/447; 524/765; 524/770; 528/26; 528/28; 528/33
[58] Field of Search .................... 528/28, 26, 33; 524/765, 770; 427/386, 387; 428/412, 447

[56] References Cited

U.S. PATENT DOCUMENTS

| 2,721,873 | 10/1955 | MacKenzie et al. | 260/448.2 |
| 2,776,910 | 1/1957 | Erickson et al. | 117/62 |
| 3,291,775 | 12/1966 | Holm | 260/47 |
| 3,910,797 | 10/1975 | Beers | 106/1 |
| 4,026,826 | 5/1977 | Yoshida et al. | 260/2 S |
| 4,151,327 | 4/1979 | Lawton | 428/447 |
| 4,348,431 | 9/1982 | O'Malley | 427/387 |
| 4,378,250 | 3/1983 | Treadway et al. | 106/287.11 |
| 4,394,177 | 7/1983 | Fujioka et al. | 106/287.14 |
| 4,560,704 | 12/1985 | Regnier et al. | 528/28 |

*Primary Examiner*—Melvyn I. Marquis
*Attorney, Agent, or Firm*—Shenier & O'Connor

[57] ABSTRACT

An abrasion-resistant coating composition for use on transparent plastic substrates and the like is formed from a first component derived by partial hydrolysis from a hydrolyzable epoxysilane and a second component comprising the reaction product of a non-silane-based aliphatic polyamine and a ketone or aldehyde. The two components are mixed to allow regenerated amino groups of the first component to react with the epoxy groups of the second component to form a partially polymerized mixture which is diluted with a solvent and applied to the substrate and heated to complete the curing process.

33 Claims, No Drawings

SILOXANE-BASED TINTABLE COATING

BACKGROUND OF THE INVENTION

This invention relates to a siloxane-based tintable coating composition for forming abrasion-resistant coatings on lenses or other optical articles, especially those formed from synthetic plastics.

In recent years, synthetic plastics such as polycarbonate have replaced glass in many optical applications, particularly opthalmic lenses, because of the lighter weight and superior impact resistance of the plastics. However, plastics such as polycarbonate are relatively soft, and must receive an abrasion-resistant coating to provide an acceptable level of abrasion or scratch resistance. Many abrasion-resistant coating compositions of the prior art are of the polysiloxane type, in which crosslinking is provided by condensation of silane groups formed by hydrolysis of alkoxysilanes. Representative compositions of this type are disclosed in Treadway et al U.S. Pat. No. 4,378,250 and the references cited therein. Although the compositions disclosed in these references are useful in the formation of abrasion-resistant coatings, considerable room for improvement remains in terms of abrasion resistance and tintability.

SUMMARY OF THE INVENTION

One object of our invention is to provide a coating that is more abrasion-resistant than those of the prior art.

Another object of our invention is to provide an abrasion-resistant coating that is more readily tintable than those of the prior art.

Still another object of our invention is to provide an abrasion-resistant coating that is readily applied to the substrate.

A further object of our invention is to provide an abrasion-resistant coating that satisfactorily adheres to the substrate to which it is applied, both before and after tinting.

A still further object of our invention is to provide an abrasion-resistant coating that is cosmetically acceptable.

Other and further objects will be apparent from the description that follows.

In general, our invention contemplates an abrasion-resistant coating composition, for use on transparent plastic substrates and the like, which is formed from a first component derived by partial hydrolysis from a hydrolyzable epoxysilane and a second component comprising the reaction product of a non-silane-based aliphatic polyamine and a carbonyl-containing compound selected from the group consisting of ketones and aldehydes. The two components are mixed to allow regenerated amino groups of the second component to react with the epoxy groups of the first component to form a partially polymerized mixture, which is diluted with a solvent and applied to the substrate and heated to complete the curing process.

The second component of the composition should be present in an amount sufficient for the polyamine regenerated therefrom to react with the majority of the epoxy groups otherwise available for forming the reaction product. Preferably there should be enough of the polyamine present to react with all or substantially all of such groups. This implies that if there are other amines present, the non-silane-based aliphatic polyamine supplies a major portion of the amino groups that react with the epoxy groups to form the final cured coating.

Suitable hydrolyzable epoxysilanes include compounds of the formula

where Q is a group containing the epoxy structure

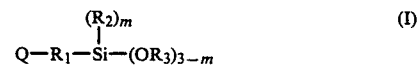

$R_1$ is a bivalent hydrocarbon radical; $R_2$ and $R_3$ are independently selected hydrocarbon radicals, and m is an integer betwe 0 and 2.

Preferably the epoxy-containing group Q is glycidoxy or epoxycyclohexyl, preferably 3,4-epoxycyclohexyl if the latter. $R_1$ is preferably $C_1$-$C_4$ alkylene, especially trimethylene (—$CH_2CH_2CH_2$—) if Q is glycidoxy and ethylene (—$CH_2CH_2$—) if Q is 3,4-epoxycyclohexyl. Thus the preferred choices for Q—$R_1$— are γ-glycidoxypropyl and β-(3,4-epoxycyclohexyl)ethyl.

Preferably $R_2$ is $C_1$-$C_4$ alkyl, especially methyl, while $R_3$ is preferably $C_1$-$C_4$ alkyl, especially methyl or ethyl, or alkenyl, especially isopropenyl. Although it is possible to use compounds of Formula I in which m is 2, m is preferably 0 or 1 and more preferably 0. The preferred compound of Formula I, which was used in the bulk of our work, is γ-glycidoxypropyl-trimethoxysilane.

Compounds of Formula I are hydrolyzed to a stoichiometrically determined degree by the addition of appropriate amounts of water followed by modest heating, in accordance with the following reaction scheme:

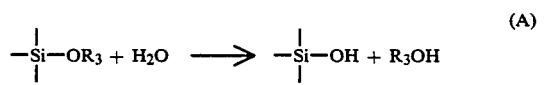

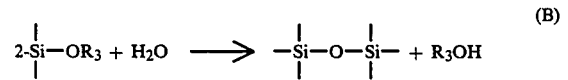

where $R_3$ is defined as above.

Hydrolysis (reaction A) occurs when the —$OR_3$ groups of the epoxysilane (I) react with water to generate a silanol (III), bearing hydroxy groups, together with the alcohol $R_3OH$. Hydrolysis is also accompanied by some degree of condensation (reaction B), in which the hydroxy groups of the silanol (III) condense to form the siloxy moiety (IV). Sufficient water should be used to produce at least about 40% hydrolysis, and preferably between about 70% and about 95% hydrolysis, of the epoxysilane. The alcohol $R_3OH$ formed by the condensation remains in the system. Residual hydroxy groups are converted to siloxy groups by condensation when the final coating composition is cured. In general, any non-silane-based aliphatic polyamine will satisfy the requirements for the polyfunctional amine. By "polyamine" as used herein is meant a compound having at least two reactive (i.e., primary or secondary) amino groups. By "aliphatic" as used herein is meant a compound in which the reactive-amino nitrogens are attached to carbon atoms that do not form part of an aromatic nucleus.

Suitable amines include compounds of the formula

  (V)

in which each R is independently hydrogen, a univalent aliphatic hydrocarbon radical or $$-A-N-R$$
$$\quad\ |$$
$$\quad\ R$$

with each R of the latter group being similarly defined and with at least two R's on different nitrogens being hydrogen; and each A is an independently selected bivalent aliphatic hydrocarbon radical. Preferably A is alkylene, especially a straight-chain alkylene of the formula $-(CH_2)_n-$, while each R is $$-A-N-R$$
$$\quad\ |$$
$$\quad\ R$$

or hydrogen.

A particular subgroup of said amines include compounds of the formula

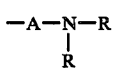  (Va)

in which m is a positive integer and each A is a bivalent aliphatic hydrocarbon radical. Particular amines of Formula Va in which A is ethylene ($-CH_2CH_2-$) include ethylenediamine (m=1), diethylenetriamine (m=2) and triethylenetetramine (m=3). Most of our work involved the use of ethylenediamine, which is the preferred polyamine.

The polyamine ultimately reacts with the epoxy groups of the epoxysilane to form a crosslinked polymeric network. The polyamine is, however, first stabilized by the addition of a carbonyl-containing compound (i.e., a ketone or aldehyde) to form a reaction product. The reaction product regenerates the amine when heated during the curing cycle, allowing it to crosslink the network at that time.

The reaction product of the polyamine and the carbonyl compound depends on the starting materials. Primary amino groups of the polyamine react with the carbonyl compound (VI) to form ketimine groups (VII) according to the scheme

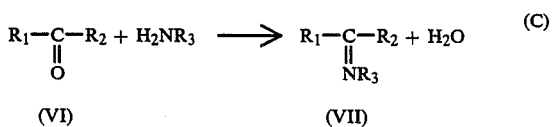

Secondary amino groups react with carbonyl compounds containing α-hydrogens (VIII) to form enamines (IX) according to the reaction scheme

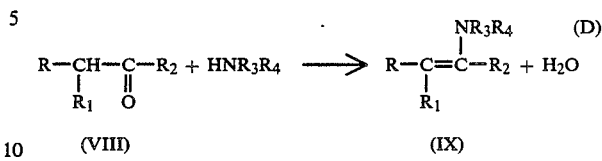

and with carbonyl compounds containing no α-hydrogens (X) to form aminals (XI) according to the overall reaction scheme

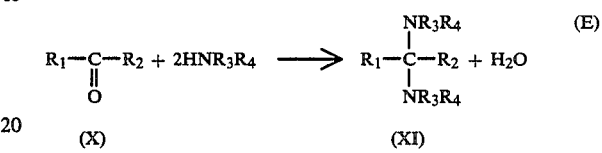

The particular reactions are described in further detail in March, *Advanced Organic Chemistry*, pp. 817–818 (1977) and the references cited therein.

Suitable carbonyl-containing compounds include aliphatic ketones such as acetone, methyl ethyl ketone, methyl isobutyl ketone and diacetone alcohol; aromatic ketones such as acetophenone and benzophenone; aliphatic aldehydes such as acetaldehyde and propionaldehyde; and aromatic aldehydes such as benzaldehyde. Diacetone alcohol, however, is preferred. Ultimately the carbonyl-containing compound is driven off as a vapor when the amine is regenerated during cure. Preferably an excess of carbonyl compound over the stoichiometric amount is used to ensure that reaction C, D or E is driven to completion.

Suitable solvents include alcohols such as methanol, ethanol, n-propanol, isopropanol and n-butanol; ketones such as acetone, methyl ethyl kerone, methyl isobutyl ketone and diacetone alcohol; and mixtures thereof. Also contemplated are glycol ethers such a propyleneglycol methyl ether (available under the trademark Dowanol PM), higher acetate esters and the like. The preferred solvent is a mixture of isopropanol, n-butanol and diacetone alcohol, preferably in a volumetric ratio of 4:3:3. The particular step at which the solvent is added is not critical. The first and second components may be prepared in solution, or all or part of the solvent added later. We have found it convenient, however, to add part of the solvent chilled to the reaction mixture of the first and second components to quench the polymerization reaction and later add the rest of the solvent to achieve the desired viscosity.

The composition preferably includes a surfactant, used as a flow-control agent for regulating film thickness and enhancing the cosmetic appearance of the coated article. Of the numerous surfactants that are known, a commonly available one used in the preferred composition is the fluorinated surfactant available from Minnesota Mining and Manufacturing Co. under the trademark Fluorad FC-430.

The composition may also include a partially hydrolyzed alkyltrialkoxysilane such as methyltriethoxysilane to increase the siloxy content of the network. However, no improvement in abrasion resistance was noted using this additive, and it is therefore not included in the preferred formulation.

DESCRIPTION OF THE PREFERRED EMBODIMENTS

EXAMPLE 1

807 ml of γ-glycidoxypropyltrimethoxysilane is hydrolyzed with 188 ml of distilled water by adding them together and warming to 80° C. for one hour or until the mixture clarifies. The mixture is allowed to cool to room temperature in a covered container. This effects 95% hydrolysis.

In a separate container, 121 ml of ethylenediamine is mixed with 1302 ml of diacetone alcohol, or 1 mole of the diamine per 6 moles of diacetone alcohol. This latter mixture is allowed to stand at room temperature for one hour to allow the amino groups of the diamine to react with the carbonyl groups of the alcohol to form ketimine functional groups.

The two prepared components are then mixed together with stirring at room temperature. This effects a ratio of 2 moles of epoxysilane to 1 mole of ethylenediamine. The molecular weight builds as the system undergoes an exothermic reaction. About one hour later the reaction is quenched by the addition of 414 ml of cold (10° F.) diacetone alcohol, and the entire mixture is placed in a refrigerator at 10° F. for a minimum of 3 to 4 hours.

To the mixture are then added 414 ml of n-butanol, 550 ml of isopropanol, and 2 ml of Fluorad FC-430, all at 10° F. The solution thus formed is mixed until homogenized and stored at 10° F. The above-described formulation provides one gallon of coating.

Typically the solution is maintained at a working temperature of 30° F. The viscosity of the solution prepared in this manner at 30° F. is 27 centipoise. Solids content is 18%. The coating is applied to polycarbonate lenses by dipping them into the solution and withdrawing them at a rate of 0.2 inch per second. The lenses are pre-cured at 167° F. for 15 minutes and finally cured for 3 hours at 265° F.

The resultant lenses were tested as follows

| Test | Method | Result |
|---|---|---|
| Adhesion | Crosshatch, 16 squares | 100% adhesion |
| Abrasion | 84 psi, 0000 steel wool | No scratches |
| Tintability | 25 minutes, Gentone Tru-Grey Dye at 205° F. | 15% transmission |
| Adhesion after tinting | Crosshatch, 16 squares | 100% adhesion |
| Coating thickness | Interferometer | 4.5 ± 0.5 microns |

EXAMPLE 2

The general procedure of Example 1 is followed except that the ethylenediamine is mixed with 953 ml of methyl ethyl ketone instead of diacetone alcohol. The resultant lenses exhibited properties similar to those noted above but with a modest decrease in the coating adhesion after tinting.

EXAMPLE 3

The general procedure of Example 1 is followed except that instead of the butanol-isopropanol-diacetone alcohol system described, a system comprising 691 ml methanol, 481 ml isopropanol and 206 ml diacetone alcohol is used. The resultant lenses, although useful, exhibited surface cosmetic defects commonly known as orange peel.

EXAMPLE 4

The general procedure of Example 1 is followed except that 390 ml of methyltriethoxysilane is independently hydrolyzed with 84 ml of distilled water at 80° C. for one hour. The mixture is cooled to room temperature and added to the hydrolyzed epoxy-silane just as it is added to the stabilized diamine. The resultant coated lenses exhibited good adhesion and only moderate abrasion, and tinted to a transmittance of 0.25 (25% transmission) at 205° F. in the dye bath.

EXAMPLES 5 TO 10

Diethylenetriamine (DTA), triethylenetetramine (TTA) and p-phenylenediamine (PDA) were evaluated as alternatives to ethylenediamine. In each example, the first component was formed from 94 ml γ-glycidoxypropyltrimethoxysilane and 21.6 ml water, while the second component was formed from the indicated amount of the amine listed in the table below and (except for Example 10) 150 ml diacetone alcohol, in a 6:1 molar ratio of alcohol to amine. The solvent used in each example was a mixture of 46 ml n-butanol, 46 ml diacetone alcohol and 61 ml isopropanol, to which 0.2 ml of the surfactant Fluorad FC-430 was also added. In Examples 7 and 9, equimolar amounts of amine were used with respect to the amine of Example 5; in Examples 6 and 8, amounts of amine were used that were equivalent in nitrogen content to the amine of Example 5. Reaction conditions were otherwise similar to those of Example 1. Percent transmission (T) was measured after a tinting time of 30 minutes. The results are summarized in the following table:

| Example | Amine | | Adhesion | % T |
|---|---|---|---|---|
| 5 | EDA | 14 ml | Pass | 15% |
| 6 | DTA | 15 ml | Pass | 1% |
| 7 | DTA | 23 ml | Pass | 4% |
| 8 | TTA | 16 ml | Pass | 54% |
| 9 | TTA | 32 ml | Pass | 10% |
| 10 | PDA | 22.5 ml | — | — |

The p-phenylenediamine exhibited only very slight solubility in diacetone alcohol, acetone or methyl ethyl ketone. We were unable to make a coating sample using this aromatic amine, owing to its poor solubility in the solvents tested. The other, aliphatic amines readily formed coatings. The triethylenetetramine of Example 8 was less tintable than the control of Example 5, but appeared more abrasion-resistant.

EXAMPLES 11 to 15

Various carbonyl-containing compounds were evaluated as alternatives to diacetone alcohol. In each case 150 ml of the carbonyl compound was used. Ingredients and reaction conditions were otherwise similar to those of Example 5. The results are summarized in the following table:

| Example | Carbonyl Compound | Adhesion | % T |
|---|---|---|---|
| 11 | Propionaldehyde | Fail | 3 |

-continued

| Example | Carbonyl Compound | Adhesion | % T |
|---|---|---|---|
| 12 | Ethyl propionate | — | — |
| 13 | Acetophenone | Pass | 10 |
| 14 | Benzaldehyde | Pass | 10 |
| 15 | Diacetone alcohol | Pass | 6 |

In Example 12, a liquid coating was formed which precipitated on the lens. The adhesion test of Example 11 and the other examples is a relatively severe test normally performed on commercial articles; the coating of Example 11 yielded a useful article. Improved adhesion results would be expected given suitable reaction conditions such as a longer curing time. The aldehydes of Examples 11 and 14 reacted exothermically with the amine, which had to be added dropwise to prevent the solution from boiling over.

EXAMPLE 16

97 ml of Union Carbide A186 β-(3,4-epoxycyclohexyl)ethyltrimethoxysilane was used instead of the glycidoxysilane of Example 15. Reaction conditions were otherwise similar. The coated lens tinted to a transmittance of 0.10 (10% transmission) and passed the adhesion test.

EXAMPLE 17

108 ml of Petrarch G6710 γ-glycidoxypropylmethyldiethoxysilane was used instead of the trialkoxysilane of Example 15. Reaction conditions were otherwise similar. The coated lens tinted to a transmittance of 0.03 and passed the adhesion test. Both this composition and that of Example 16 formed good coatings.

It will be seen that we have achieved the objects of our invention. Our coating composition, which is readily applied to the substrate, provides a highly abrasion-resistant, readily tintable coating that satisfactorily adheres to the substrate to which it is applied, both before and after tinting.

It will be understood that certain features and subcombinations are of utility and may be employed without reference to other features and subcombinations. This is contemplated by and is within the scope of our claims. It is further obvious that various changes may be made in details within the scope of our invention. It is, therefore, to be understood that our invention is not to be limited to the specific details shown and described.

Having thus described our invention, what we claim is:

1. An abrasion-resistant coating composition comprising a first component derived by partial hydrolysis from a hydrolyzable epoxysilane, said epoxysilane being at least about 40% hydrolyzed, and a second component derived by reaction of a non-silane-based aliphatic polyamine with a carbonyl-containing compound selected from the group consisting of ketones and aldehydes.
2. A composition as in claim 1 in which said polyamine contains at least two primary amino groups.
3. A composition as in claim 1 in which said polyamine is a compound of the formula

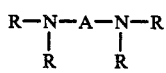

in which each R is independently hydrogen, a univalent aliphatic hydrocarbon radical or

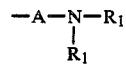

where each $R_1$ is independently hydrogen or a univalent aliphatic hydrocarbon radical; and each A is independently a bivalent aliphatic hydrocarbon radical.
4. A composition as in claim 1 in which said polyamine is a compound of the formula

in which m is a positive integer and each A is an independently a bivalent aliphatic hydrocarbon radical.
5. A composition as in claim 3 in which A is alkylene.
6. A composition as in claim 3 in which A is —$(CH_2)_n$—, where n is a positive integer.
7. A composition as in claim 4 in which A is ethylene.
8. A composition as in claim 4 in which m is between 1 and 3.
9. A composition as in claim 1 in which said polyamine is ethylenediamine, diethylenetriamine or triethylenetetramine.
10. A composition as in claim 1 in which said polyamine is ethylenediamine.
11. A composition as in claim 1 in which said polyamine is diethylenetriamine.
12. A composition as in claim 1 in which said polyamine is triethylenetetramine.
13. A composition as in claim 1 in which said carbonyl-containing compound is a ketone.
14. A composition as in claim 1 in which said carbonyl-containing compound is an aliphatic ketone.
15. A composition as in claim 1 in which said carbonyl-containing compound is diacetone alcohol.
16. A composition as in claim 1 in which said epoxysilane is a glycidoxyalkyltrialkoxysilane.
17. A composition as in claim 1 in which said epoxysilane is γ-glycidoxypropyltrimethoxysilane.
18. A method of forming an abrasion-resistant coating on a substrate including the steps of mixing a partially hydrolyzed epoxysilane with the reaction product of a non-silane-based aliphatic polyamine and a ketone or aldehyde, said epoxysilane being at least about 40% hydrolyzed, and applying said mixture to the surface of said substrate.
19. A method as in claim 18 in which said mixture is applied while dissolved in an organic solvent.
20. A method as in claim 18 in which said mixture contains a sufficient amount of said reaction product to react with the majority of the epoxy groups of said epoxysilane.
21. An article of manufacture comprising a substrate and an abrasion-resistant coating thereon comprising the reaction product of a first reactant comprising a partially hydrolyzed epoxysilane, said epoxysilane being at least about 40% hydrolyzed, and a second reactant derived by reacting a non-silane-based aliphatic polyamine with a ketone or aldehyde.
22. An article as in claim 21 in which said substrate is optically transparent.
23. An article as in claim 21 in which said substrate is an optical substrate.

24. An article as in claim 21 in which said substrate comprises an organic plastic material.

25. An article as in claim 21 in which said substrate comprises polycarbonate.

26. An article as in claim 21 in which said polyamine contains at least two primary amino groups.

27. An article as in claim 21 in which said polyamine is a compound of the formula

in which m is a positive integer and each A is independently a bivalent aliphatic hydrocarbon radical.

28. An article as in claim 21 in which said polyamine is ethylenediamine, diethylenetriamine or triethylenetetramine.

29. A composition as in claim 1 in which said epoxysilane is between about 70% and about 95% hydrolyzed.

30. A composition as in claim 1 containing a sufficient amount of said second component to react with the majority of the epoxy groups of said epoxysilane.

31. An article as in claim 21 in which said second reactant has reacted with the majority of the epoxy groups of said epoxysilane.

32. An article produced by the method of claim 18, 19 or 20.

33. An article as in claim 21 in which said polyamine is a compound of the formula

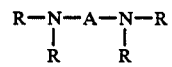

in which each R is independently hydrogen, a univalent aliphatic hydrocarbon radical or

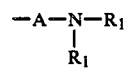

where each $R_1$ is independently hydrogen or a univalent aliphatic hydrocarbon radical; and each A is independently a bivalent aliphatic hydrocarbon radical.

* * * * *